(12) United States Patent
Choi et al.

(10) Patent No.: US 10,003,826 B2
(45) Date of Patent: Jun. 19, 2018

(54) METHOD OF REDUCING NOISE OF VIDEO SIGNAL

(71) Applicant: SAMSUNG SDS CO., LTD., Seoul (KR)

(72) Inventors: Jung-Ah Choi, Seoul (KR); Jin-Ho Choo, Seoul (KR); Bo-Youn Kim, Seoul (KR); Young-Min Shin, Seoul (KR); Seong-Jong Ha, Seoul (KR); Jeong-Seon Yi, Seoul (KR); Yeon-Hee Kwon, Seoul (KR); Sun-Ah Kang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 166 days.

(21) Appl. No.: 15/095,472

(22) Filed: Apr. 11, 2016

(65) Prior Publication Data

US 2017/0127088 A1 May 4, 2017

(30) Foreign Application Priority Data

Oct. 29, 2015 (KR) ........................ 10-2015-0151245

(51) Int. Cl.
| | |
|---|---|
| *H04N 19/44* | (2014.01) |
| *H04N 19/86* | (2014.01) |
| *H04N 19/172* | (2014.01) |
| *H04N 19/117* | (2014.01) |
| *H04N 19/154* | (2014.01) |
| *H04N 19/40* | (2014.01) |

(52) U.S. Cl.
CPC ........... *H04N 19/86* (2014.11); *H04N 19/117* (2014.11); *H04N 19/154* (2014.11); *H04N 19/172* (2014.11); *H04N 19/40* (2014.11)

(58) Field of Classification Search
CPC .. H04N 19/117; H04N 19/154; H04N 19/172; H04N 19/40; H04N 19/86
USPC ....................................... 375/340.03
See application file for complete search history.

(56) References Cited

U.S. PATENT DOCUMENTS

| | | | |
|---|---|---|---|
| 8,331,438 B2 | 12/2012 | Chang et al. | |
| 8,879,856 B2* | 11/2014 | Raveendran | H04N 5/144 |
| | | | 375/240 |
| 2004/0076271 A1* | 4/2004 | Koistinen | G10L 19/005 |
| | | | 379/88.11 |

(Continued)

FOREIGN PATENT DOCUMENTS

| | | |
|---|---|---|
| JP | 4129006 B2 | 7/2008 |
| KR | 10-0960742 B1 | 6/2010 |
| KR | 10-2012-0015495 A | 2/2012 |

OTHER PUBLICATIONS

Farrugia et al, Enhancing the error detection capabilities of DCT based codecs using compressed domain dissimilarity metrics (Year: 2007).*

(Continued)

*Primary Examiner* — Shan E Elahi
(74) *Attorney, Agent, or Firm* — Sughrue Mion, PLLC (57) ABSTRACT

Disclosed is a method for reducing noise. The method comprises decoding a bitstream encoded with a first codec, acquiring Quantization Parameter (QP) values determined in a process of encoding the bitstream with the first codec, detecting a frame with noise by using the QP values and inputting the frame with noise to a predefined noise filter.

10 Claims, 6 Drawing Sheets

(56) References Cited

U.S. PATENT DOCUMENTS

| | | | | |
|---|---|---|---|---|
| 2007/0081587 A1* | 4/2007 | Raveendran | H04N 5/144 | 375/240.1 |
| 2008/0151993 A1* | 6/2008 | Mitsuya | H04N 19/61 | 375/240.01 |
| 2008/0240250 A1* | 10/2008 | Lin | H04N 19/147 | 375/240.18 |
| 2010/0104027 A1* | 4/2010 | Youn | H04N 19/00066 | 375/240.29 |
| 2012/0269266 A1* | 10/2012 | Lin | H04N 19/147 | 375/240.03 |
| 2013/0114725 A1* | 5/2013 | Lou | H04N 19/52 | 375/240.16 |
| 2013/0177084 A1* | 7/2013 | Wang | H04N 19/00684 | 375/240.16 |
| 2013/0271566 A1* | 10/2013 | Chen | H04N 13/0048 | 348/43 |
| 2014/0161189 A1* | 6/2014 | Zhang | H04N 19/597 | 375/240.16 |
| 2014/0301463 A1* | 10/2014 | Rusanovskyy | H04N 19/52 | 375/240.14 |
| 2015/0172714 A1* | 6/2015 | Wu | H04N 19/597 | 375/240.12 |

OTHER PUBLICATIONS

Communication dated Feb. 27, 2017, issued by the Korean Intellectual Property Office in counterpart Korean Application No. 10-2015-0151245.

Communication issued by the Korean Intellectual Property Office dated Sep. 8, 2017 in counterpart Korean Patent Application No. 10-2015-0151245.

* cited by examiner

$QP_{cur}$ > PREDEFINED THRESHOLD VALUE?

[fig. 5]

① $dQP_{cur-prev} = |QP_{cur} - QP_{prev}|$

② $dQP_{cur-next} = |QP_{cur} - QP_{next}|$

[fig. 6]

③ $dQP_{prev-next} = |QP_{prev} - QP_{next}|$

METHOD OF REDUCING NOISE OF VIDEO SIGNAL

This application claims priority to Korean Patent Application No. 10-2015-0151245 filed on Oct. 29, 2015 in the Korean Intellectual Property Office, the disclosure of which is incorporated herein by reference in its entirety.

BACKGROUND

1. Field of the Invention

The invention relates to a method of reducing noise of a video signal, and more particularly, to a method of reducing noise of a video signal, which is capable of detecting and reducing noise generated in a quantization step of an encoding process.

2. Description of the Related Art

Noise reduction in a conventional video transcoding process is performed by detecting noise using the intra-picture coding mode or the motion vector of a block and filtering the noise.

However, the conventional noise reduction method cannot detect noise resulting from variations in Quantization Parameters (QPs) that may be encountered during an encoding process.

Figure 1:
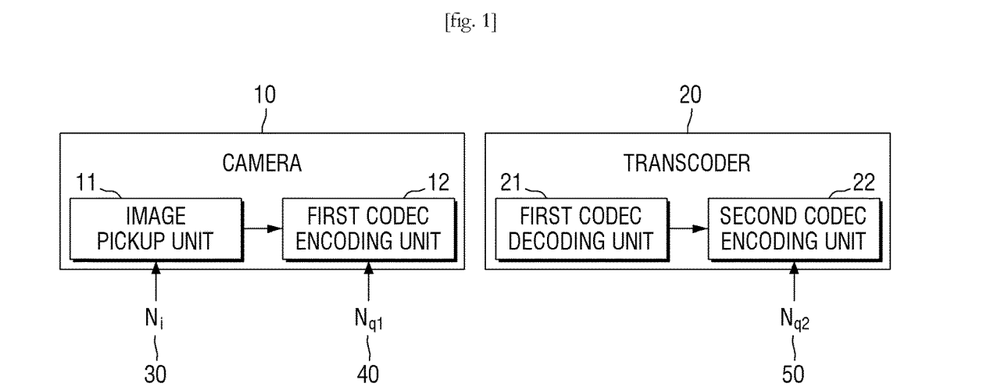
FIG. 1 is a schematic view for explaining noise that may be generated in a conventional video transcoding system.

FIG. 1 is a schematic view for explaining noise that may be generated in a conventional video transcoding system.

Referring to FIG. 1, the conventional video transcoding system includes a camera 10 and a transcoder 20. The camera 10 includes an image pickup unit 11, which picks up an image, and a first codec encoding unit 12, which converts a bitstream to an arbitrary first codec to transmit the picked-up image.

The transcoder 20 receives the converted bitstream, decodes the received bitstream using a first codec decoding unit 21, and converts the decoded bitstream to a second codec using a second codec encoding unit 22.

However, a transcoding process performed by the conventional video transcoding system may include pickup noise 30, which is generated during the pickup of an image by the image pickup unit 11, first quantization noise 40, which is generated during the encoding of the image by the first codec encoding unit 12, and second quantization noise 50, which is generated during the encoding of the image by the second codec encoding unit 22.

Accordingly, the necessity of a method to reduce quantization noise generated during the conversion of a bitstream from an arbitrary first codec to an arbitrary second codec has arisen.

SUMMARY

Exemplary embodiments of the invention provide a method of reducing noise of a video signal, which is capable of reducing noise generated in a quantization process.

Exemplary embodiments of the invention also provide a method of reducing noise of a video signal, which is capable of improving the similarities between frames and the compression rate of the frames by extracting a frame with large noise so as to reduce noise.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, there is provided a method for reducing noise, the method comprising decoding a bitstream encoded with a first codec, acquiring Quantization Parameter (QP) values determined in a process of encoding the bitstream with the first codec, detecting a frame with noise by using the QP values and inputting the frame with noise to a predefined noise filter.

In an embodiment of the present invention, wherein the detecting the frame with noise, comprises determining a frame having a QP value that exceeds a predefined threshold value as the frame with noise.

In an embodiment of the present invention, wherein the acquiring the QP values, comprises acquiring QP values respectively applied to frames that are sequentially displayed.

In an embodiment of the present invention, wherein the detecting the frame with noise, comprises: calculating a first difference, which is the difference between a QP value of a first frame and a QP value of a second frame, calculating a second difference, which is the difference between the QP value of the second frame and a QP value of a third frame and determining the second frame as the frame with noise if the first and second differences exceed the predefined threshold value.

In an embodiment of the present invention, wherein the detecting the frame with noise, further comprises: calculating a third difference, which is the difference between the QP value of the first frame and the QP value of the third frame and determining the second frame as the frame with noise if the first or second difference exceeds the third difference.

In an embodiment of the present invention, the method further comprising: encoding the bitstream with a second codec.

According to another aspect of the present invention, there is provided a noise reduction apparatus comprising a decoding unit decoding a bitstream encoded with a first codec, a QP acquisition unit acquiring QP values determined in a process of encoding the bitstream with the first codec, a noise extraction unit detecting a frame with noise by using the QP values and a noise filtering unit reducing noise from the frame with noise.

In an embodiment of the present invention, wherein the noise extraction unit determines a frame having a QP value that exceeds a predefined threshold value as the frame with noise.

In an embodiment of the present invention, wherein the QP acquisition unit acquires QP values respectively applied to frames that are sequentially displayed.

In an embodiment of the present invention, wherein the noise extraction unit calculates a first difference, which is the difference between a QP value of a first frame and a QP value of a second frame, and a second difference, which is the difference between the QP value of the second frame and a QP value of a third frame, and determines the second frame as the frame with noise if the first and second differences exceed the predefined threshold value.

In an embodiment of the present invention, wherein the noise extraction unit further calculates a third difference, which is the difference between the QP value of the first frame and the QP value of the third frame, and determines the second frame as the frame with noise if the first or second difference exceeds the third difference.

In an embodiment of the present invention, further comprising: an encoding unit encoding the bitstream with a second codec.

According to another aspect of the present invention, there is provided a noise reduction apparatus comprising one or more processors, a memory loading a computer program that is executed by the processors and a storage storing a noise reduction computer program capable of reducing noise from a video signal, wherein the noise reduction computer program comprises: an operation decoding a bitstream encoded with a first codec, an operation acquiring QP values determined in a process of encoding the bitstream with the first codec, an operation detecting a frame with noise by using the QP values and an operation inputting the frame with noise to a predefined noise filter.

According to another aspect of the present invention, there is provided a computer program stored in a computer-readable recording medium stored in a computer-readable recording medium, for executing, in connection with a computing device, the steps of: decoding a bitstream encoded with a first codec, acquiring QP values determined in a process of encoding the bitstream with the first codec, detecting a frame with noise by using the QP values and inputting the frame with noise to a predefined noise filter.

According to the exemplary embodiments, noise generated in a quantization process can be reduced.

In addition, the similarities between frames and the compression rate of the frames can be improved by extracting a frame with large noise so as to reduce noise.

Other features and aspects will be apparent from the following detailed description, the drawings, and the claims.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, it will be understood that the singular forms are intended to include the plural forms as well. It will be further understood that the terms "comprises" and/or "comprising," when used in this specification, specify the presence of stated features, integers, steps, operations, elements, and/or components, but do not preclude the presence or addition of one or more other features, operations, elements, and/or components thereof.

Figure 2:
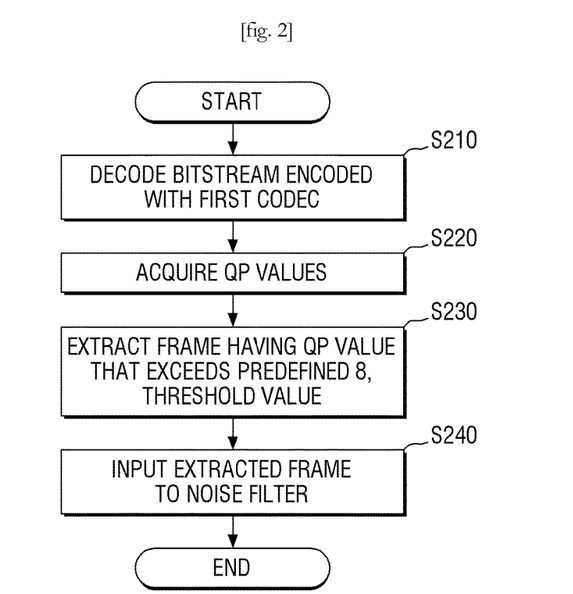
FIG. 2 is a flowchart illustrating a method of reducing noise according to an exemplary embodiment of the invention.

FIG. 2 is a flowchart illustrating a method of reducing noise according to an exemplary embodiment of the invention.

The exemplary embodiment of FIG. 2 will hereinafter be described, taking a bitstream encoded with an arbitrary first codec as an example. The first codec may be implemented in various types capable of compressing a video signal.

In response to a bitstream encoded with the first codec being received, the bitstream is decoded (S210). The decoding of the bitstream may be performed by performing steps of the encoding of the bitstream in reverse order. More specifically, video information of a spatial domain may be generated by ① converting compressed encoded values into symbols, ② performing inverse quantization so as to acquire Discrete Cosine Transform (DCT) coefficients, and ③ performing inverse DCT.

A noise reduction apparatus according to an exemplary embodiment of the invention acquires Quantization Parameter (QP) values (S220) determined in the process of encoding the bitstream with the first codec.

A QP is needed to inversely quantize symbol-type encoded values and thus to acquire DCT coefficients. Accordingly, QP information regarding QP values set in the process of compressing a video signal with the first codec is included in the bitstream encoded with the first codec.

An encoder may acquire DCT coefficients by performing DCT on an N×N pixel block of an arbitrary frame. A process of dividing the DCT coefficients by a predetermined value to remove high-frequency components that are of less importance is referred to as quantization, and the predetermined value is referred to as the QP.

Accordingly, the noise reduction apparatus may acquire QP values from the bitstream encoded with the first codec. More specifically, the aforementioned encoding process is performed in units of frames of a video signal, and the noise reduction apparatus may acquire the QP value of each of the frames.

Different frames may have different QP values. For example, a relatively large QP value may be applied to a frame whose compression rate needs to be increased according to the size of bandwidth for transmitting a bitstream, and a relatively small QP value may be applied to a frame whose compression rate does not need to be increased.

Accordingly, a first frame may be quantized with a first QP value, and a second frame, which is different from the first frame, may be quantized with a second QP value, which is different from the first QP value.

Once the QP value of each frame is acquired, a frame with noise is extracted using the QP value of each frame. More specifically, a frame having a QP value larger than a predefined threshold value may be extracted as a frame with noise (S230).

In the case of a frame with a relatively large QP value, a large amount of data is likely to be lost from the frame in the process of increasing the compression rate of the frame, and thus, a large amount of noise may be generated in the frame after the decoding of the frame due to the data loss.

Thus, a frame with a QP value that exceeds the predefined threshold value may be extracted as a frame with noise.

Once the frame with noise is extracted, noise is reduced by inputting the extracted frame to a noise filter (S240). The noise filter may be a Low Pass Filter (LPF), but the invention is not limited thereto. That is, various other general-purpose filters capable of reducing noise may also be used.

In short, the bitstream encoded with the first codec may be decoded, noise caused by the QP may be reduced during the decoding of the bitstream encoded with the first codec, and the decoded bitstream is encoded back with a second codec, thereby performing transcoding.

According to the exemplary embodiment of FIG. 2, noise caused by the QP may be reduced, and the compression rate of a video signal may be improved when performing transcoding with the second codec.

A process of increasing the compression rate of a video signal by reducing noise will be described later with reference to FIGS. 7 and 8.

Figure 3:
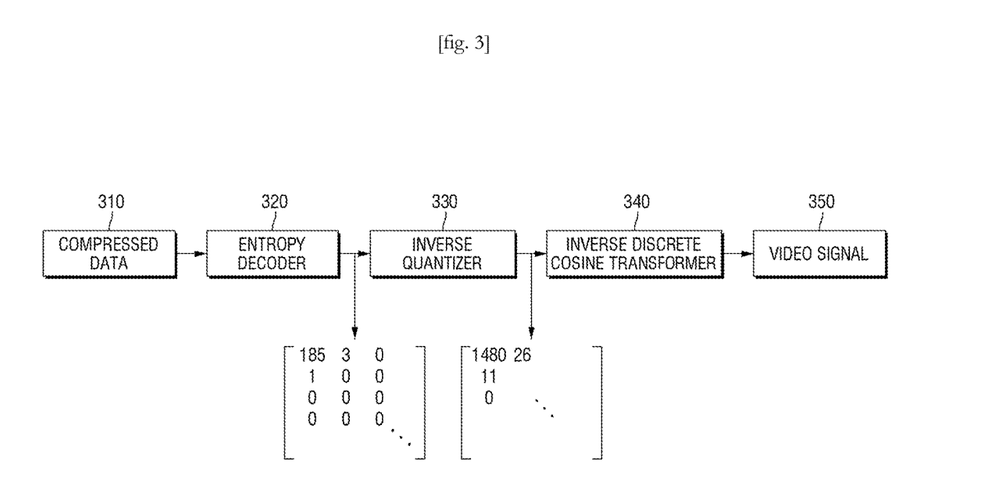
FIG. 3 is a block diagram for explaining a process of acquiring the Quantization Parameter (QP) value of each frame according to an exemplary embodiment of the invention.

FIG. 3 is a block diagram for explaining a process of acquiring the QP value of each frame according to an exemplary embodiment of the invention.

Referring to FIG. 3, compressed data 310 may be a video signal encoded with a first codec, i.e., a bitstream. The compressed data 310 may be a code consisting of 0s and 1s and may include brightness and color components of the video signal.

An entropy decoder 320 receives the compressed data 310 and converts the compressed data into original symbol values. The symbol values are values acquired by quantizing DCT coefficients during an encoding process.

An inverse quantizer 330 inversely quantizes the symbol values and thus outputs DCT coefficients. In order for the inverse quantizer 330 to perform inverse quantization, QP values used in a quantization process are needed.

The compressed data 310 includes QP information regarding a QP value applied to each frame of the video signal. Accordingly, the noise reduction apparatus may acquire the QP value of each frame from the compressed data 310, i.e., the bitstream.

Thereafter, the inverse quantizer 330 outputs DCT coefficients yet to be quantized, and an inverse discrete cosine transformer 340 outputs a video signal 350 including video information of a spatial domain.

Figure 4:
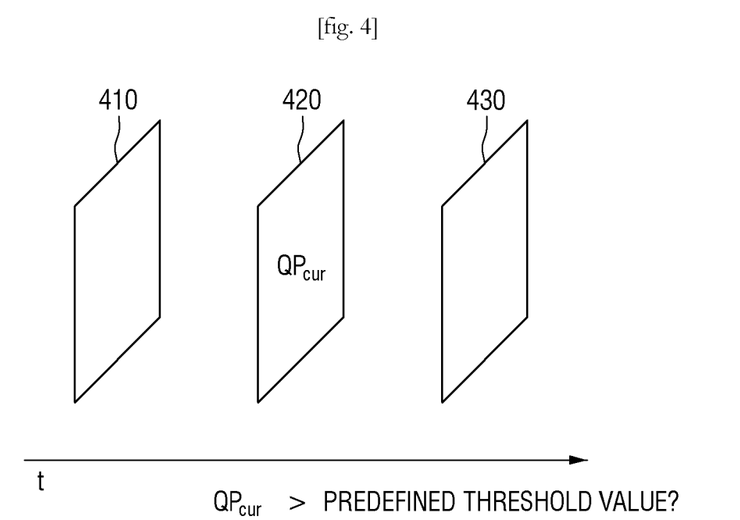
FIG. 4 is a schematic view for explaining a method of detecting a frame with noise according to an exemplary embodiment of the invention.

FIG. 4 is a schematic view for explaining a method of detecting a frame with noise according to an exemplary embodiment of the invention.

Referring to FIG. 4, a first frame 410, a second frame 420, and a third frame 430 may be consecutive frames that are sequentially displayed. That is, since a video signal is a set of pictures that are consecutively captured within a given period of time, the first, second, and third frames 410, 420, and 430 may be perceived as a motion video when displayed one after another.

The noise reduction apparatus may acquire a QP value applied to each frame by performing the decoding process described above with reference to FIG. 3.

If the QP value of a particular frame exceeds a predefined threshold value, the particular frame may be determined as a frame with noise. As mentioned above, the larger the QP value of the particular frame, the larger the amount of high-frequency components removed from the particular frame. That is, the larger the QP value of the particular frame, the larger the amount of data lost during a compression process. Accordingly, if the particular frame is decoded, a large amount of noise may be included in the particular frame. Therefore, a frame having a QP value that exceeds the predefined threshold value may be determined as a frame with noise.

For example, if a QP value $QP_{cur}$ of the second frame 420 exceeds the predefined threshold value, the second frame 420 may be determined as a frame with noise.

However, the invention is not limited to the exemplary embodiment of FIG. 4, but may be implemented in various other manners.

Figure 5:
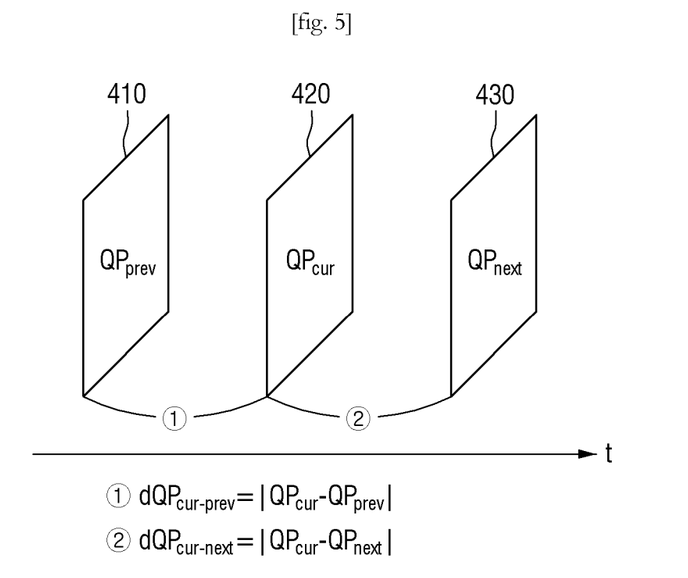
FIG. 5 is a schematic view for explaining a method of detecting a frame with noise according to another exemplary embodiment of the invention.

FIG. 5 is a schematic view for explaining a method of detecting a frame with noise according to another exemplary embodiment of the invention.

Referring to FIG. 5, a first frame 410, a second frame 420, and a third frame 430 may be sequentially displayed, as already mentioned in the exemplary embodiment of FIG. 4. That is, a motion video may be played by displaying the first frame 410, then displaying the second frame 420, and then displaying the third frame 430.

The noise reduction apparatus calculate a first difference, which is the difference between the QP value of the first frame 410 and the QP value of the second frame 420, and a second difference, which is the difference between the QP value of the second frame 420 and the QP value of the third frame 430.

More specifically, the first and second differences may be calculated by Equations (1) and (2), respectively, as illustrated in FIG. 5:

$$dQP_{cur-prev} = |QP_{cur} - QP_{prev}| \qquad (1); \text{ and}$$

$$dQP_{cur-next} = |QP_{cur} - QP_{next}| \qquad (2).$$

where $dQP_{cur-prev}$ denotes the first difference, $QP_{cur}$ denotes the QP value of the second frame 420, $QP_{prev}$ denotes the QP value of the first frame 410, $dQP_{cur-next}$ denotes the second difference, and $QP_{next}$ denotes the QP value of the third frame 430.

Thereafter, if the first and second differences exceed a predefined threshold value, the second frame 420 may be determined as a frame with noise.

That is, in a case where the first and second differences both exceed the predefined threshold value, the QP value of the second frame 420 is much larger than the QP value of the first frame 410 and the QP value of the third frame 430.

In this case, a bitstream corresponding to the second frame 420 may be in a state of having a large amount of high-frequency components removed therefrom. Thus, if the bitstream is decoded, a large amount of noise may be included in the second frame 420.

According to the exemplary embodiment of FIG. 5, a frame with a large amount of noise may be detected.

Figure 6:
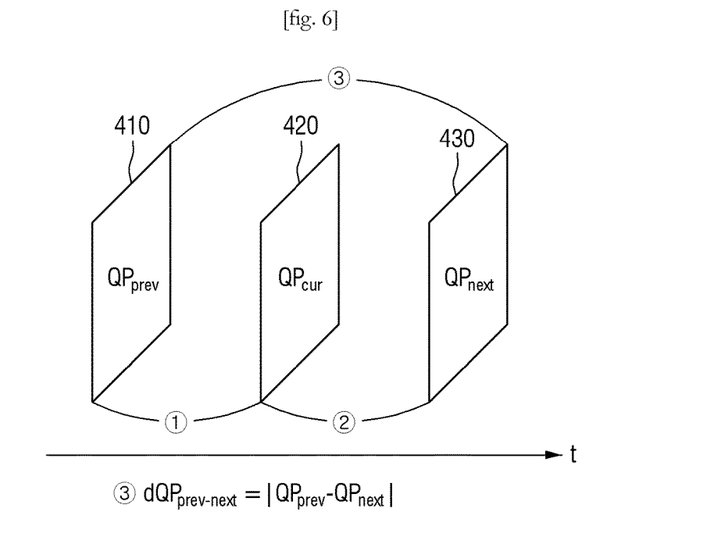
FIG. 6 is a schematic view for explaining a method of detecting a frame with noise according to another exemplary embodiment of the invention.

FIG. 6 is a schematic view for explaining a method of detecting a frame with noise according to another exemplary embodiment of the invention.

Referring to FIG. 6, the noise reduction apparatus may calculate not only first and second differences, but also a third difference, which is the difference between the QP value of a first frame 410 and the QP value of a third frame 430.

The QP value of the third frame 430 may be calculated by Equation (3), as illustrated in FIG. 6:

$$dQP_{prev-next} = |QP_{prev} - QP_{next}| \qquad (3)$$

where $dQP_{prev-next}$ denotes the third difference, $QP_{prev}$ denotes the QP value of the first frame 410, and $QP_{next}$ denotes the QP value of the third frame 430.

In a case where the QP value of a second frame 420 is much larger than the QP value of the first frame 410 and the QP value of the third frame 430, the first or second difference may exceed the third difference.

As already mentioned above, since a frame with a large QP value includes a large amount of noise, the second frame 420 may be determined as a frame with noise.

Once a frame with noise is detected using at least one of the methods of FIGS. 4 through 6, the frame may be input to a filter so as to reduce noise.

A method of reducing noise by inputting a frame with noise to a filter is already well known and obvious to a person skilled in the art to which the invention pertains, and thus, a detailed description thereof will be omitted.

In short, by detecting a frame with noise and reducing noise, the similarities between consecutive frames of a video signal may be enhanced. As a result, the compression rate of the video signal may be improved when transcoding a decoded bitstream with a second codec.

Figure 7:
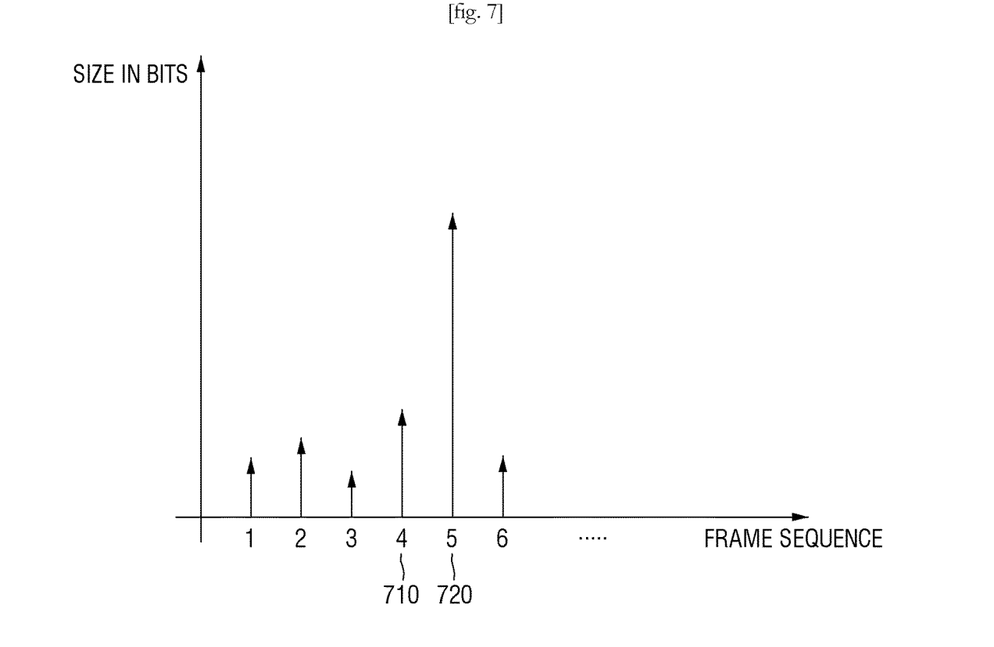
FIGS. 7 and 8 are graphs for explaining a process of increasing the compression rate of a video signal by detecting a frame with noise and reducing noise.
Figure 8:
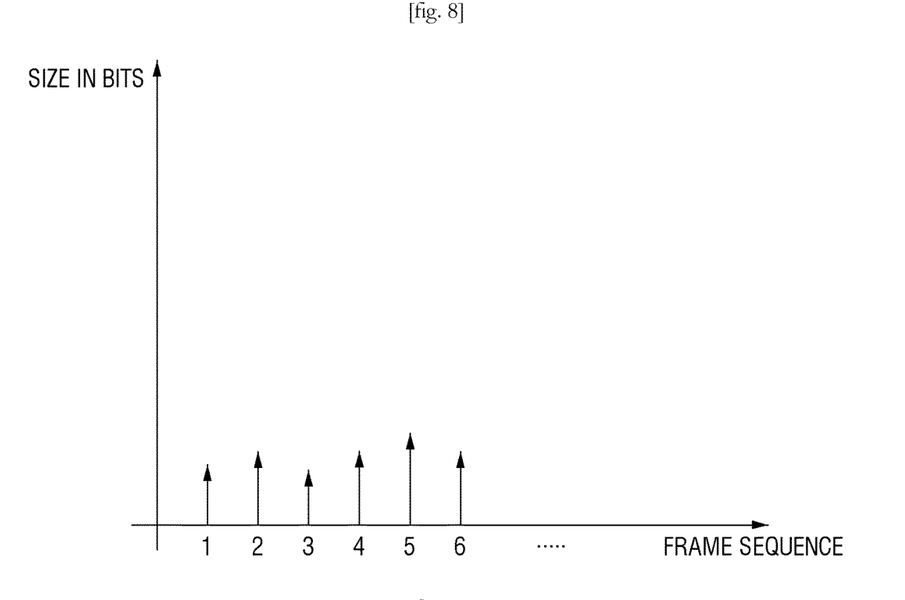

FIGS. 7 and 8 are graphs for explaining a process of increasing the compression rate of a video signal by detecting a frame with noise and reducing noise.

There is a method of compressing a video signal using inter-frame temporal correlations. This method reduces the size of a video based on the fact that adjacent frames are generally very similar.

A 24 Frames Per Second (FPS) video signal includes 24 frames for a one-second period. That is, since a motion video is played by exposing similar frames for a short period of time, pixels from temporally adjacent frames are highly likely to have similar values.

That is, the more similar the temporally adjacent frames of a video signal are to each other, the higher the compression rate of the video signal becomes. On the other hand, if too much noise is included in an arbitrary frame, the similarities between the arbitrary frame and its previous and subsequent frames may be lowered, and as a result, the compression rate of the video signal may also be lowered.

Referring to FIG. 7, the X axis represents frames that are sequentially displayed, and the Y-axis represents the size in bits of the frames.

A fifth frame 720 has a large size in bits than the other frames, and this may be due to an excessive quantization of a fourth frame 710 that is temporally adjacent to the fifth frame 720.

That is, if the fourth frame 710 is quantized by applying a large QP value to the fourth frame 710, a large amount of high-frequency components may be removed from the fourth frame 710, and as a result, a large amount of data may be lost from the fourth frame 710. Then, if the fourth frame 710 is decoded, an excessive number of noise may be generated, and due to this noise, the similarity between the fourth frame 710 and the fifth frame 720 may be lowered.

Accordingly, the compression rate of the fifth frame 720 may decrease, and thus, the fifth frame 720 may have a larger size in bits than the other frames. If the noise of the fourth frame 710 is reduced by the method according to the exemplary embodiment of FIG. 2, the similarity between the fourth frame 710 and the fifth frame 720 may be improved, and thus, the size in bits of the fifth frame 720 may be reduced.

More specifically, referring to FIG. 8, in response to the noise of the fourth frame 710 being reduced, the similarity between the fourth frame 710 and the fifth frame 720 may be improved, and thus, the bitrate of the fifth frame 720 may be lowered.

Figure 9:
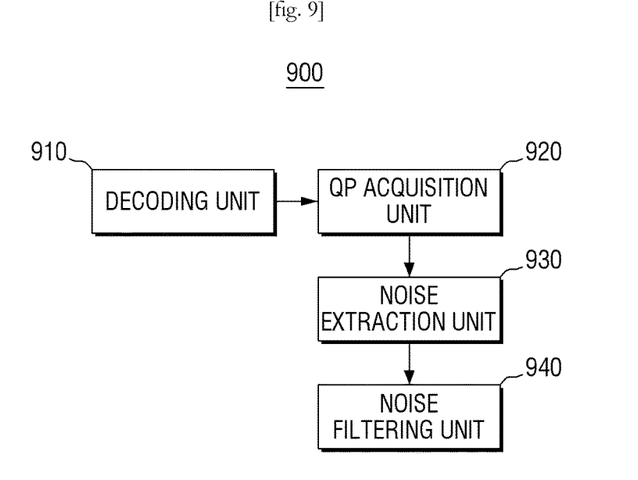
FIG. 9 is a functional block diagram of a noise reduction apparatus according to an exemplary embodiment of the invention.

FIG. 9 is a functional block diagram of a noise reduction apparatus according to an exemplary embodiment of the invention.

Referring to FIG. 9, a noise reduction apparatus 900 includes a decoding unit 910, a QP acquisition unit 920, a noise extraction unit 930, and a noise filtering unit 940. FIG. 9 illustrates only the elements of the noise reduction apparatus 900 that are relevant to the invention. Accordingly, it is obvious that the noise reduction apparatus 900 may also include other general-purpose elements than those illustrated in FIG. 9.

The decoding unit 910 decodes a bitstream encoded with a first codec. More specifically, the decoding unit 910 generates video information of a spatial domain by ① converting compressed encoded values into symbols, ② performing inverse quantization so as to acquire DCT coefficients, and ③ performing inverse DCT.

The QP acquisition unit 920 acquires QP values that have been determined in the process of encoding the bitstream with the first codec. The QP values are included in the bitstream encoded with the first codec. The QP values may be set to differ from one frame to another frame.

The noise extraction unit 930 extracts a frame with noise using the QP values. The noise extraction unit 930 may determine a frame having a QP value that exceeds a predefined threshold value as the frame with noise. Alternatively, the noise extraction unit 930 may detect the frame with noise by calculating the differences between the QP values of consecutive frames.

A method of detecting the frame with noise by calculating the differences between the QP values of consecutive frames has already been described above with reference to FIGS. 4 through 6, and thus, a detailed description thereof will be omitted.

Once the noise extraction unit 930 detects the frame with noise, the noise filtering unit 940 inputs the frame with noise to a filter so as to filter the noise.

The noise filtering unit 940 may be provided as an LPF, but the invention is not limited thereto. That is, the noise filtering unit 940 may also be provided as a general-purpose filter, other than an LPF, capable of reducing noise.

The noise reduction apparatus 900 may also include an encoding unit (not illustrated), which decodes the bitstream encoded with the first codec for transcoding and then encodes the resulting video signal with noise reduced therefrom back with a second codec.

The noise reduction apparatus 900 may reduce noise that may be generated in a quantization process. Also, by reducing the noise, the noise reduction apparatus 900 may enhance the similarities between frames and may thus improve the compression rate of the frames.

Figure 10:
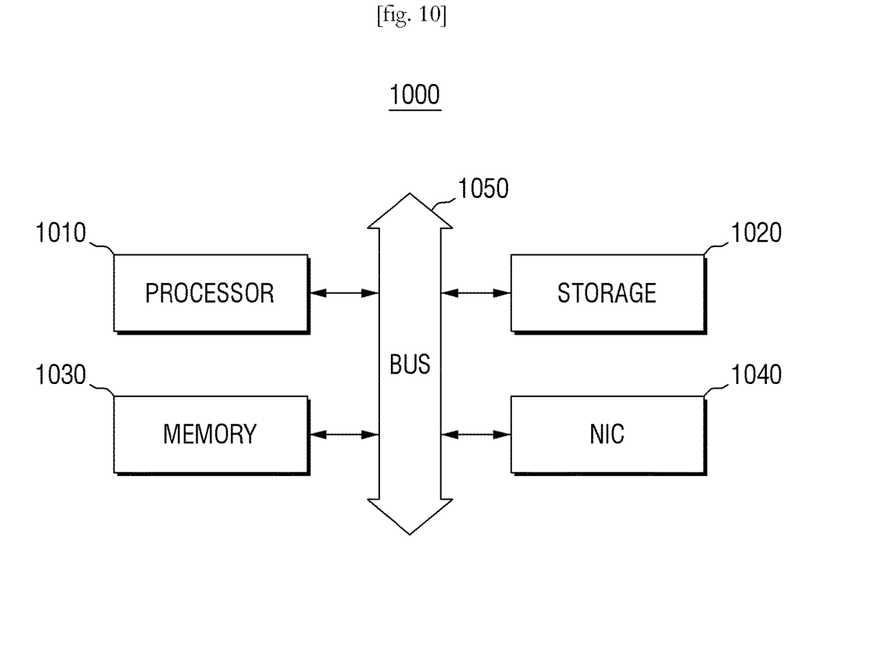
FIG. 10 is a functional block diagram of a noise reduction apparatus according to another exemplary embodiment of the invention.

FIG. 10 is a functional block diagram of a noise reduction apparatus according to another exemplary embodiment of the invention.

Referring to FIG. 10, a noise reduction apparatus 1000 includes a processor 1010, a storage 1020, a memory 1030, a network interface 1040, and a bus 1050. FIG. 10 illustrates only the elements of the noise reduction apparatus 1000 that are relevant to the invention. Accordingly, it is obvious that the noise reduction apparatus 1000 may also include other general-purpose elements than those illustrated in FIG. 10.

The processor 1010 executes a noise reduction program capable of reducing noise from a video signal. However, a program that can be executed by the processor 1010 is not particularly limited. That is, various other general-purpose programs may also be executed by the processor 1010.

The storage 1020 stores the noise reduction program. The storage 1020 may also store in advance information regarding a predefined threshold value for detecting a frame with noise. More specifically, a frame with noise may be detected by comparing the QP value of the frame with the predefined threshold value, and thus, the predefined threshold value may be stored in advance in the storage 1020.

The noise reduction program executes the steps of: decoding a bitstream encoded with a first codec; acquiring QP values determined in the process of encoding the bitstream with the first codec; detecting a frame with noise by using the QP values; and inputting the frame with noise to a predefined noise filter.

The memory 1030 loads the noise reduction program and thus allows the noise reduction program to be executed in the processor 1010.

Various computing devices may be connected to the network interface 1040, and the bus 1050 serves as a data transfer path to which the processor 1010, the storage 1020, the memory 1030, and the network interface 1040 are all connected.

The method of reducing noise according to the present invention can be recorded in programs that can be executed on a computer and be implemented through general purpose digital computers. In addition, the data format used in the method for generating the web page according to the present invention may be recorded in a computer-readable recording medium using various means. Examples of the computer-readable recording medium may include recording media such as magnetic storage media (e.g., ROMs, floppy disks, hard disks, etc.) and optical recording media (e.g., CD-ROMs or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims

What is claimed is:

1. A computer implemented method of reducing noise, comprising:
   decoding a bitstream encoded with a first codec wherein the bitstream comprises a first frame, a second frame that is a next frame of the first frame in time order, and a third frame that is a next frame of the second frame in time sequence;
   acquiring a Quantization Parameter (QP) value of the first frame, a QP value of the second frame, and a QP value of the third frame, determined in a process of encoding the bitstream with the first codec;
   determining the second frame as a frame including noise based on a result obtained by comparing the QP value of the second frame with the QP value of the first frame and the QP value of the third frame; and
   inputting the second frame including noise to a predefined noise filter.

2. The method of claim 1, wherein the determining the second frame as a frame including noise comprises determining the second frame having a QP value that exceeds a predefined threshold value, as the frame including noise.

3. The method of claim 1, further comprising: encoding the bitstream with a second codec.

4. A noise reduction apparatus, comprising:
   a decoder decoding a bitstream encoded with a first codec wherein the bitstream comprises a first frame, a second frame that is a next frame of the first frame in time order, and a third frame that is a next frame of the second frame in time sequence;
   a Quantization Parameter (QP) acquisitor acquiring a QP value of the first frame, a QP value of the second frame, and a QP value of the third frame, determined in a process of encoding the bitstream with the first codec;
   a noise extractor detecting the second frame as a frame including noise based on a result obtained by comparing a QP value of the second frame with QP value of the first frame and QP value of the third frame; and
   a noise filter reducing noise from the second frame including noise.

5. The noise reduction apparatus of claim 4, wherein the noise extractor determines the second frame having a QP value that exceeds a predefined threshold value as the frame including noise.

6. The noise reduction apparatus of claim 4, wherein the noise extractor calculates a first difference, which is a difference between a first QP value of a first frame and a second QP value of a second frame, and a second difference, which is a difference between the second QP value of the second frame and a third QP value of a third frame, and determines the second frame as the frame including noise if each of the first and the second differences exceed the predefined threshold value.

7. The noise reduction apparatus of claim 6, wherein the noise extractor calculates a third difference, which is the difference between the first QP value of the first frame and the third QP value of the third frame, and determines the second frame as the frame including noise if the first difference or the second difference exceeds the third difference.

8. The noise reduction apparatus of claim 4, further comprising: an encoder encoding the bitstream with a second codec.

9. A noise reduction apparatus, comprising:
   one or more processors;
   a memory loading a computer program that is executed by the one or more processors; and
   a storage storing a noise reduction computer program capable of reducing noise from a video signal,
   wherein the noise reduction computer program comprises:
   an operation decoding a bitstream encoded with a first codec, wherein the bitstream comprises a first frame, a second frame that is a next frame of the first frame in time order, and a third frame that is a next frame of the second frame in time sequence;

an operation acquiring a Quantization Parameter (QP) value of the first frame, a QP value of the second frame, and a QP value of the third frame, determined in a process of encoding the bitstream with the first codec;

an operation determining the second frame as a frame including noise based on a result obtained by comparing the QP value of the second frame with the QP value of the first frame and the QP value of the third frame; and an operation inputting the second frame including noise to a predefined noise filter.

10. A computer program stored in a non-transitory computer-readable recording medium, for executing, in connection with a computing device comprising at least a processor and a memory, the steps of:

decoding a bitstream encoded with a first codec wherein the bitstream comprises a first frame, a second frame that is a next frame of the first frame in time order, and a third frame that is a next frame of the second frame in time sequence;

acquiring a Quantization Parameter (QP) value of the first frame, a QP value of the second frame, and a QP value of the third frame, determined in a process of encoding the bitstream with the first codec;

determining the second frame as a frame including noise based on a result obtained by comparing the QP value of the second frame with the QP value of the first frame and the QP value of the third frame; and inputting the second frame including noise to a predefined noise filter.

* * * * *